Oct. 30, 1951  M. E. SNODDY  2,573,369
FLUID CONTROL VALVE
Filed Sept. 9, 1946
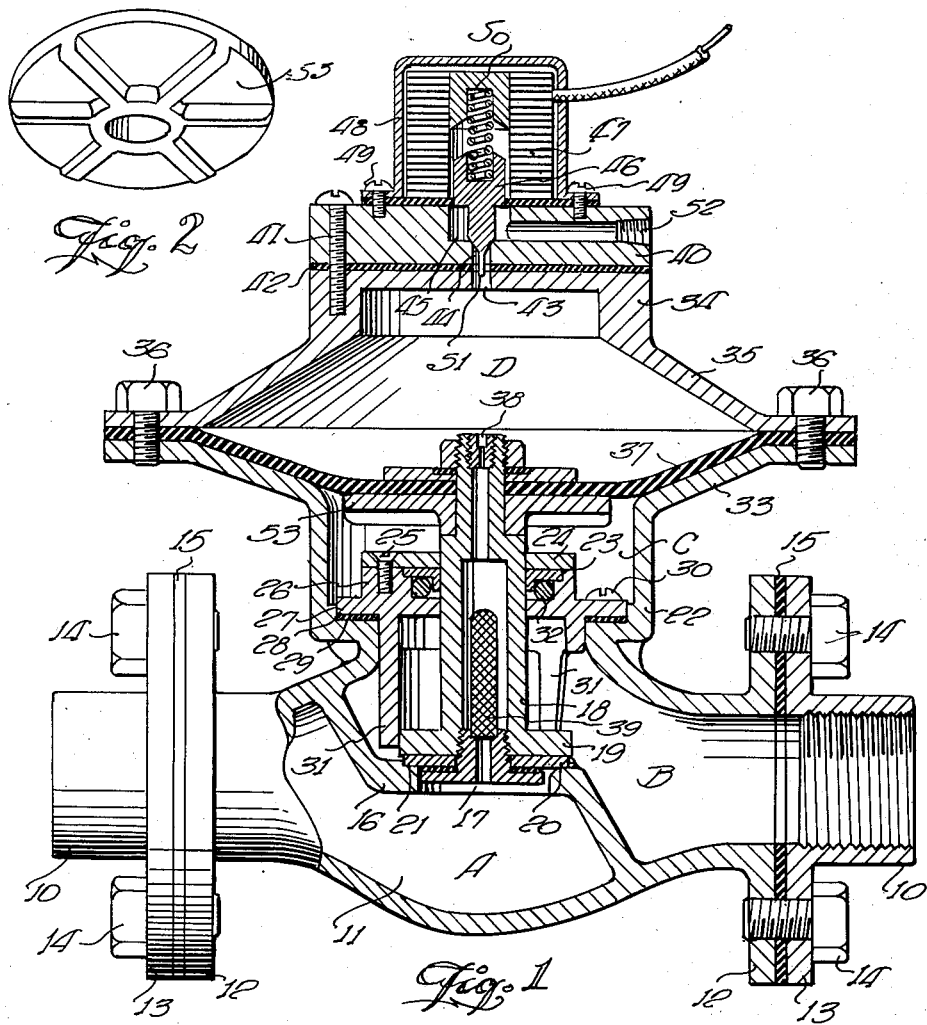
Fig. 2
Fig. 1
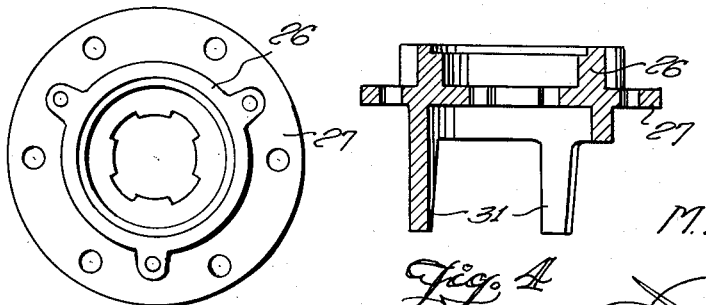
Fig. 3
Fig. 4
M. E. SNODDY
INVENTOR.
BY
ATTORNEY

Patented Oct. 30, 1951

2,573,369

UNITED STATES PATENT OFFICE 2,573,369

FLUID CONTROL VALVE

Max E. Snoddy, Dallas, Tex.

Application September 9, 1946, Serial No. 695,614

2 Claims. (Cl. 137—139)

This invention relates to hydraulic valves and more particularly to hydraulic control valves of the electro-magnetic type.

The principal object of the invention is to provide a magnetically controlled hydraulic valve consisting of a bowl incorporated in the main fluid line, auxiliary to which is a pressure chamber whose capacity is greater than that of the bowl, and during inoperative periods of the valve, fluid pressure in the bowl and in the chamber is equalized through the medium of a hollow valve stem effecting connection between the said bowl and chamber. Until pressure in the auxiliary chamber is relieved, fluid is restrained from passing through the fluid line due to the presence of a valve on the hollow valve stem and which, upon releasing pressure from the chamber, yields to the pressure in the fluid line, causing said valve to be displaced and permitting fluid to pass through the valve and continue in the fluid line.

Another object of the invention is to provide a fluid control valve comprising a bowl and pressure chamber separated by a flexible diaphragm whose presence in the assembly causes a pressure differential to exist between the bowl and chamber when the latter is evacuated. Provision is further made through electro-magnetically operated valve means to evacuate the chamber upon the closing of an electrical circuit to the electro-magnetically operated means, the fluid from the chamber being returned to the fluid line at a point beyond the discharge side of the control valve.

Another object of the invention is to provide a fluid control valve which may be operated from a point remote from the valve, either through electro-magnetic means or hydraulic means operating in substantially the same manner as the electro-magnetic means.

With the foregoing objects in view, the invention embraces other and lesser objects as well as certain features of accomplishment which will become apparent as the description proceeds, taken in connection with the accompanying drawings, wherein:

Figure 1 is a side elevational view of a fluid control valve constructed according to the present invention, shown partly in vertical section.

Figure 2 is a perspective view of the underside of the diaphragm support.

Figure 3 is a top plan view of the valve stem guide, and

Figure 4 is a side elevational view of the valve stem guide shown in Figure 3, and in vertical section.

Continuing with a more detailed description of the drawings, reference is primarily made to Figure 1 in which numeral 10 denotes a fluid supply line incorporating the fluid control valve in the present invention, the latter comprising primarily a bowl 11, on each end of which is provided a flange 12, each of said flanges abut the flanges 13 of the section of fluid supply line, said flanges 12 and 13 being secured together by means of bolts 14 and interposing a packing ring or gasket 15. The bowl 11 is separated into chambers A and B by means of a partition 16. The partition 16 is provided with an orifice 17 through which fluid moves from the chamber A into the chamber B in its passage through the valve proper. To control this passage of fluid, a hollow valve stem 18 is provided, having on its lower end a flange 19, the latter in turn carrying a washer 20 which normally rests in a counterbore 21 surrounding the orifice 17.

Superimposed upon and integral with the bowl 11 is a body 22 defining a third chamber C. The chamber C is sealed against ingress of fluid from points below and above the same, first, by means of a cup leather 23 which embraces the hollow stem 18 intermediate its ends and is held in position by means of a plate 24, secured by screws 25 to the upper end of a valve guide 26, the latter being shown in detail in Figures 3 and 4.

The valve guide 26 is formed with an annular flange 27 adjacent its upper end, which flange rests in an annular recess 28 in the body 22 on a gasket 29. Screws 30 hold the valve guide 26 in rigid relation to the body 22. The valve guide 26 is further formed to provide depending legs 31, whose lower ends are in contiguous engagement with the perimeter of the flange 19 of the hollow stem 18 and therefore serve to maintain perpendicularity of the valve stem in relation to the direction of flow of fluid through the bowl 11. It will also be observed in Figure 1 that the cup leather 23 is held in close relationship to the valve stem 18 by means of a garter spring 32. In this manner, leakage around the stem into chamber C is prevented.

The upper portion of the body 22 has an inclined flange 33, overlying which is a top 34 having an inclined flange 35 whose periphery is joined to that of the flange 33 by means of bolts 36, said flanges interposing a diaphragm 37 in the manner shown. The flanges 33 and 35 jointly define a fourth chamber D in which fluid pressure is maintained equal to that in chamber A by virtue of the orifice 38 through which fluid is passed from the chamber A by way of the hollow stem 18, which latter contains the strainer 39.

Mounted upon the portion 34 of the valve body is a cap 40, the latter being held in position by means of screws 41. A sealing gasket 42 is interposed between the body 34 and the cap 40 to prevent escape of pressure seeking to pass through the passage 43 in the center of head 34 of the upper body portion. The cap 40 has a central bore 44 in register with the passage 43 just referred to and is provided with a larger counterbore 45 in which is adapted to reciprocate the armature plunger 46 of a solenoid 47 which latter is encased in a housing 48 superimposed upon cap 40 and held thereon by means of cap screws 49. A spring 50 normally urges the plunger 46 downwardly to bring the needle valve 51 into position to close the central bore or passage 44 in the cap 40 to prevent upward passage of fluid from the chamber D during periods when the magnet 47 is deenergized. A lateral passage 52 communicates with the counterbore 45 and serves to release fluid from the chamber D, by passing the same into the fluid line 10 on the discharge side of the valve.

In operation, the valve is normally in a closed position as disclosed when the circuit is open to the electro-magnet 47. Flow of fluid is from the left to the right as the valve is illustrated, with line pressure below the seat 20 or, in other words, the chamber A. When the valve is in closed position, line pressure is present in chambers A and D, chamber D having been filled with fluid passing through hollow valve stem 18 and the orifice 38 in the top thereof.

By closing the circuit to the solenoid or magnet 47, the latter is energized and lifts the plunger 46 from the valve seat, against the resistance of the spring 50. Pressure is released from the chamber D when electro-magnetic valve opens, causing the valve stem 18 to be elevated under pressure exerted against the seat 20 in the chamber A. When the valve stem is thus forced upwardly, a diaphragm support 53, shown in detail in Figure 2, exerts an upward pressure on the diaphragm 37 thus more or less evacuating the chamber D yet permitting a continuous flow of fluid through the hollow valve stem 18 and through the outlet 52 of the electro-magnetic valve and then back into the line on the discharge side of the valve, through a suitable conduit, not shown.

When circuit to the electro-magnet 47 is opened, flow of fluid from the chamber D is blocked when the plunger 46 seats itself by gravity and compression of the spring 50. Fluid pressure against the diaphragm in chamber D, being greater in area, causes the valve 20 to close.

In certain installations, it will be desirable to operate the hydraulic valve, described by a pilot valve not shown, installed at a remote point. In such a case, the electro-magnetic feature just described will be eliminated and a small relief line connection provided in its place, so that the pilot valve may be connected to the hydraulic valve by means of a small pipe. Through this provision, the pilot valve will be a conventional valve of the globe type or needle type.

Manifestly, the construction as shown and described, is capable of some modification, and such modification as may be construed to fall within the scope and meaning of the appended claims is also considered to be within the spirit and intent of the invention.

What is claimed is:

1. In a shut-off valve for controlling the flow of fluid in a water line, a main valve body having a single fluid inlet and a single fluid outlet, a partition in said body separating said body into inlet and outlet compartments, a chamber superimposed on said body, a diaphragm in said chamber separating the outer portion of said chamber from the compartments of said body, a fluid port in said partition effecting communication between the compartments of said body, a valve in control of said port having an elongated hollow stem entering said chamber and affixed to said diaphragm and affording a restricted passage from the inlet compartment to the outer portion of the chamber whereby fluid entering the inlet compartment of said valve body will charge said chamber at a pressure equal to that in said inlet compartment to collapse said diaphragm and close said valve against passage of fluid into the outlet compartment of said body, an outlet passage for said chamber, a valve in control of said outlet passage; and electro-magnetic means for actuating said latter valve; a second chamber disposed between the valve body and the underside of the diaphragm through which the hollow valve stem passes; and means embracing the hollow valve stem preventing entrance of fluid from the valve body into the second chamber, whereby the second chamber will remain dry, thus preventing equalization of pressures in the first and second chambers.

2. A shut-off valve for pipe lines comprising a body having fluid inlet and fluid outlet compartments, a chamber superimposed on said body and communicating therewith; a diaphragm dividing said chamber into inner and outer portions; a partition separating the inlet and outlet compartments of the body and having a valve seat parallel to the diaphragm; a valve on said seat adapted to be unseated by the inlet fluid pressure; a hollow stem connecting said valve and said diaphragm and providing a restricted fluid passage from the inlet side of the valve to the outer portion of the chamber; packing around the stem at the communication between the inner chamber and the body maintaining the inner chamber dry at all times; and port means for selectively venting the outer chamber whereby when the port is closed, the fluid pressure will build up in the outer chamber forcing the diaphragm and stem inwardly to seat the valve, and conversely, when the port is open the pressure in the outer chamber will be relieved permitting the diaphragm to be moved outwardly by the inlet fluid pressure on the valve to open the latter.

MAX E. SNODDY.

REFERENCES CITED

The following references are of record in the file of this patent:

UNITED STATES PATENTS

| Number | Name | Date |
|---|---|---|
| 2,265,294 | Lange | Dec. 9, 1941 |
| 2,282,878 | Newton | May 12, 1942 |